(12) United States Patent
Dite

(10) Patent No.: US 10,676,123 B2
(45) Date of Patent: Jun. 9, 2020

(54) STEERING COLUMN ASSEMBLY

(71) Applicant: TRW LIMITED, Solihull, West Midlands (GB)

(72) Inventor: Jan Dite, Herálec (CZ)

(73) Assignee: TRW Limited, Solihull, West Midlands (GB)

(*) Notice: Subject to any disclaimer, the term of this patent is extended or adjusted under 35 U.S.C. 154(b) by 51 days.

(21) Appl. No.: 16/087,134

(22) PCT Filed: Mar. 23, 2017

(86) PCT No.: PCT/EP2017/057028
§ 371 (c)(1),
(2) Date: Sep. 21, 2018

(87) PCT Pub. No.: WO2017/162842
PCT Pub. Date: Sep. 28, 2017

(65) Prior Publication Data
US 2019/0092369 A1    Mar. 28, 2019

(30) Foreign Application Priority Data
Mar. 23, 2016   (GB) .................................. 1604976.9

(51) Int. Cl.
*B62D 1/19* (2006.01)
*B62D 1/184* (2006.01)

(52) U.S. Cl.
CPC ............. *B62D 1/184* (2013.01); *B62D 1/192* (2013.01); *B62D 1/195* (2013.01)

(58) Field of Classification Search
CPC ......... B62D 1/192; B62D 1/195; B62D 1/184
See application file for complete search history.

(56) References Cited

U.S. PATENT DOCUMENTS 5,787,759 A * 8/1998 Olgren ................... B62D 1/184
                                                              280/777
6,419,269 B1    7/2002 Manwaring et al.
(Continued)

FOREIGN PATENT DOCUMENTS

DE    102014108577 B3    9/2015
EP         3078567 A1   10/2016
(Continued)

OTHER PUBLICATIONS

Patents Act 1977: Search Report, Application No. GB 1604976.9, dated Sep. 5, 2016.
(Continued)

*Primary Examiner* — Nicole T Verley
(74) *Attorney, Agent, or Firm* — MacMillan, Sobanski & Todd, LLC

(57) ABSTRACT

A steering column assembly comprises a support bracket, a telescopic shroud having an outer shroud portion and an inner shroud portion, an energy absorbing mechanism that includes a puller, a clamp rail fixed to the inner shroud portion including a slot that extends axially along the inner shroud portion, the slot defining two opposing walls which each carry a row of teeth, the two rows thereby being spaced apart from one another with the teeth extending towards each other; the puller being positioned adjacent the slot, a clamp bolt that extends perpendicular to the shroud, and a toothed block having a row of teeth on each side, the pitch between teeth of each row being equal to, or a whole multiple of, the pitch of the teeth of the corresponding row of the slot. The block is supported by a carrier element that moves in response to rotation of the clamp bolt to move, in turn, the toothed block between a clamped position. A contact face of the puller and a contact face of the toothed block are arranged such that the toothed block is prevented from rotating more than a predetermined amount when (Continued)

forced onto the puller, urging the toothed block into engagement with the teeth of the slot.

21 Claims, 7 Drawing Sheets

(56) References Cited

U.S. PATENT DOCUMENTS

| | | | | |
|---|---|---|---|---|
| 7,685,903 B2* | 3/2010 | Streng | ............... | B62D 1/184 |
| | | | | 74/492 |
| 8,375,822 B2* | 2/2013 | Ridgway | ............... | B62D 1/184 |
| | | | | 280/775 |
| 8,505,408 B2* | 8/2013 | Havlicek | ............... | B62D 1/195 |
| | | | | 280/775 |
| 9,428,215 B1* | 8/2016 | Nagatani | ............... | B62D 1/184 |
| 9,452,772 B2* | 9/2016 | Owens | ............... | B62D 1/185 |
| 9,663,135 B2* | 5/2017 | Myohoji | ............... | B62D 1/184 |
| 9,718,490 B2* | 8/2017 | Tanaka | ............... | B62D 1/184 |
| 9,783,221 B2* | 10/2017 | Sakuda | ............... | B62D 1/195 |
| 10,011,293 B2* | 7/2018 | Nagatani | ............... | B62D 1/185 |
| 10,202,139 B2* | 2/2019 | Tanaka | ............... | B62D 1/184 |
| 10,336,362 B2* | 7/2019 | Bodtker | ............... | B62D 1/195 |
| 10,442,456 B2* | 10/2019 | Davies | ............... | B62D 1/184 |
| 2003/0057694 A1 | 3/2003 | Manwaring et al. | | |
| 2011/0041642 A1 | 2/2011 | Havlicek | | |
| 2014/0000405 A1 | 1/2014 | Anspaugh et al. | | |
| 2016/0144885 A1* | 5/2016 | Tanaka | ............... | B62D 1/187 |
| | | | | 74/493 |
| 2018/0178826 A1* | 6/2018 | Kagawa | ............... | B62D 1/195 |
| 2019/0152510 A1* | 5/2019 | Shiroishi | ............... | B62D 1/192 |
| 2019/0337552 A1* | 11/2019 | Buzzard | ............... | B62D 1/187 |

FOREIGN PATENT DOCUMENTS

| | | | | |
|---|---|---|---|---|
| EP | 3075632 B1 * | 2/2018 | | |
| EP | 3279059 B1 * | 5/2019 | | |
| GB | 2352284 A * | 1/2001 | ............. | B62D 1/184 |
| JP | 2017030726 A * | 2/2017 | ............. | B62D 1/195 |
| KR | 20110048287 A | 5/2011 | | |

OTHER PUBLICATIONS

PCT International Search Report and Written Opinion, Application No. PCT/EP2017/057028, dated Jun. 8, 2017.

* cited by examiner

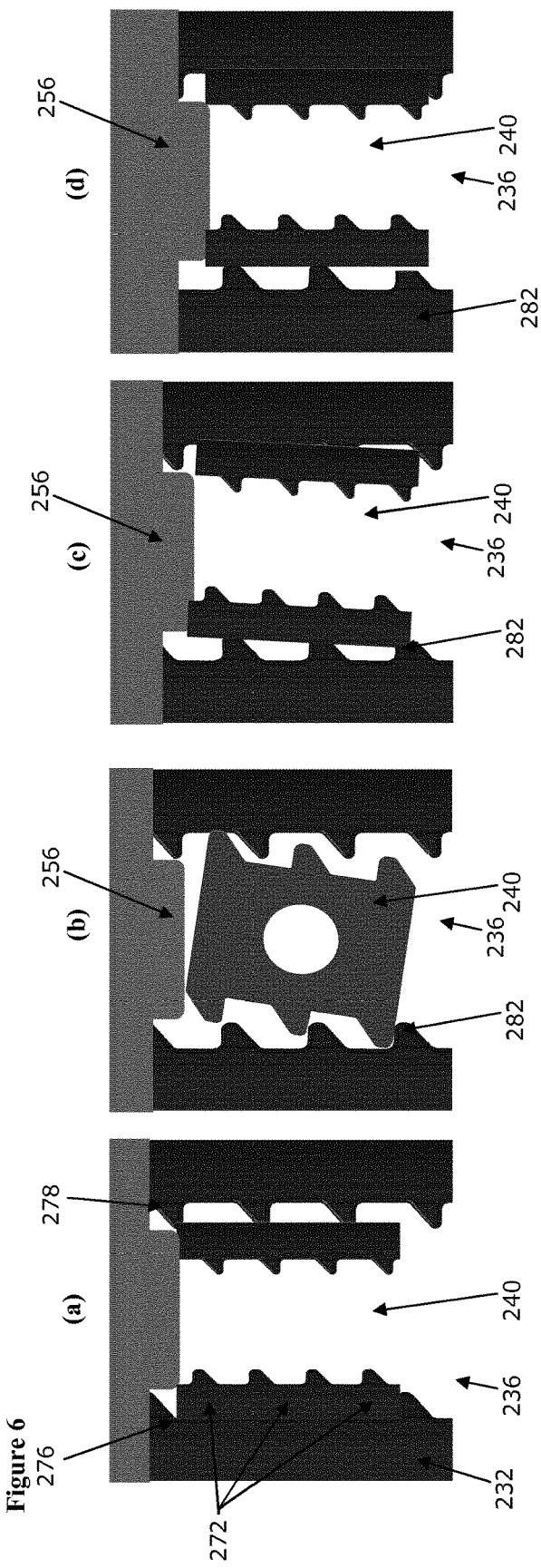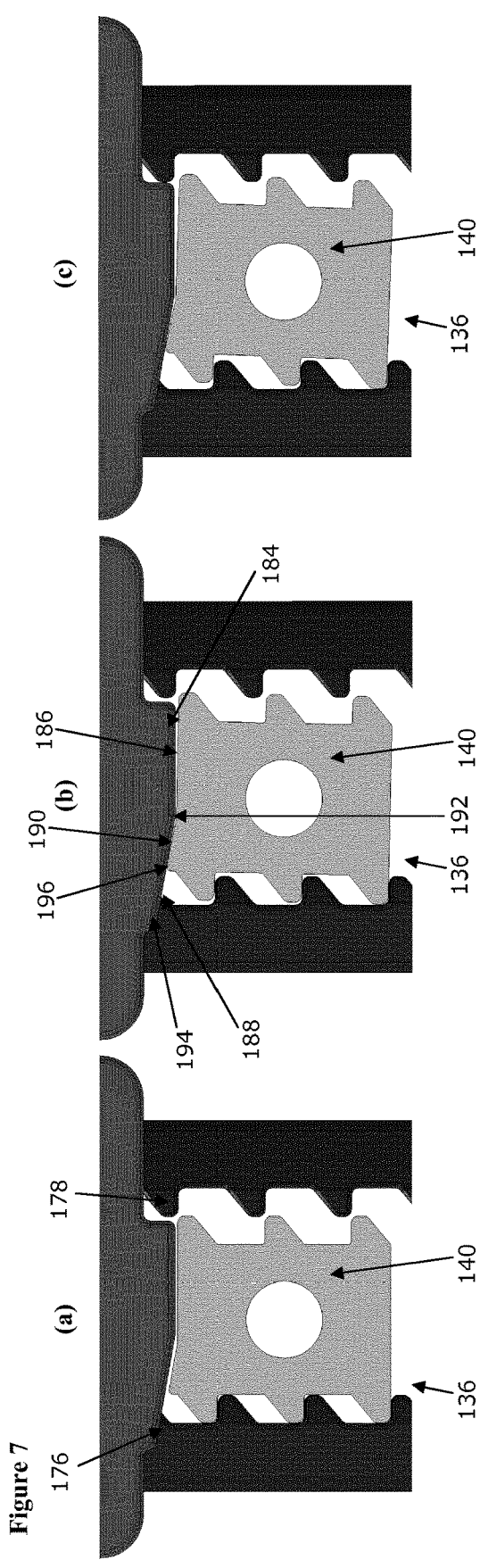

STEERING COLUMN ASSEMBLY

CROSS-REFERENCE TO RELATED APPLICATIONS

This application is a national stage of International Application No. PCT/EP2017/057028, filed 23 Mar. 2017, the disclosures of which are incorporated herein by reference in entirety, and which claimed priority to Great Britain Patent Application No. 1604976.9, filed 23 Mar. 2016, the disclosures of which are incorporated herein by reference in entirety.

BACKGROUND TO THE INVENTION

This invention relates to improvements in steering column assemblies and in particular those steering assemblies including positive locking to improve the collapse characteristics of the assembly.

It is known to provide a collapsible steering column assembly comprising a steering shaft that is supported within a steering column shroud. To prevent significant injury to the driver in the event of a crash the steering column should be able to collapse as an axial load is applied through the steering wheel, for instance in a front impact where an unrestrained driver is thrown onto the steering wheel.

A typical collapsible steering column assembly comprises a telescopic shroud, having an outer shroud portion and an inner shroud portion, an end of the inner shroud portion extending into the outer shroud portion. The outer shroud portion may be located closer to the steering wheel, or further from the steering wheel than the inner shroud portion. A telescopic steering shaft, also having an upper and lower shaft part, is supported inside the shroud through one or more bearing assemblies. The steering wheel is fixed to the upper shaft portion.

The part of the shroud closest to the wheel must be able to move, or collapse, during a crash so as to allow the steering wheel to move forwards relative to the vehicle body but be prevented from moving during normal use. There is also a need to fix the shroud relative to the vehicle body to define the rake position of the steering wheel. This is typically achieved by a clamp mechanism that secures the shroud to a support bracket that is in turn fixed to the vehicle body, perhaps to a cross beam provided behind the dashboard of the vehicle. The clamp mechanism may be adjustable to permit reach adjustment, or rake adjustment, or both, of the steering wheel. In the event of a crash the shroud must be able to move, and this is achieved if it is able to break free of the clamp mechanism, or for the support bracket to be able to break free of the vehicle body, to allow the steering column assembly to collapse telescopically.

A lever may be provided on an end of the a clamp bolt that forms a part of the clamp mechanism that the driver can push or pull to rotate the clamp bolt and thereby operate the clamp mechanism.

Steering column assemblies are known which include a clamp mechanism that relies solely on friction when locked to prevent unwanted movement of the column assembly. The clamp mechanism can be unlocked and locked by movement of a locking lever or, sometimes, electrically using a motor or perhaps hydraulically or pneumatically. These columns can typically resist radial and/or axial forces of 600N applied at the steering wheel before slipping.

However, it is increasingly a requirement from car manufacturers that there should be no substantial movement of the steering column assembly when forces of up to 6000N are applied. The objective is to prevent unwanted movements of the steering wheel in a crash so that the deployment of the air bag is ideally controlled.

For this, friction alone is often insufficient, as massive clamp forces would be needed to achieve this. Some method of Positive Locking is needed. Typically this involves the use of inter-engaging teeth.

There is a well-known problem with the type of "Positive-Locking" column which uses rows of inter-engaging teeth whereby, prior to operation of the locking lever by the driver, the selected steering wheel position has resulted in exact alignment of the tips of one row of teeth with the tips of the set of teeth with which they are supposed to engage. Inter-engaging of the teeth during the clamping operation is thereby blocked and, if excessive force is applied by the driver to the clamp lever to force it to complete its travel, permanent damage can occur to the tips of the teeth. At the very least, such a Tooth-on-Tooth occurrence will require the driver to consciously re-release the lever, find a slightly different wheel position and then re-engage the lever. Unless special means are provided to overcome this problem, then it is likely to occur during 10% to 20% of all adjustment operations. This is undesirable.

SUMMARY OF THE INVENTION

In accordance with a first aspect of the invention there is provided a steering column assembly comprising:
a support bracket,
a telescopic shroud having an outer shroud portion and an inner shroud portion, an end of the inner shroud portion extending into the outer shroud portion, the inner shroud portion being fixed in position relative to the support bracket by a clamp mechanism,
an energy absorbing mechanism that includes a puller,
a clamp rail fixed to the inner shroud portion including a slot that extends axially along the inner shroud portion, the slot defining two opposing walls which each carry a row of teeth, the two rows thereby being spaced apart from one another with the teeth extending towards each other; the puller being positioned adjacent the slot,
a clamp bolt that extends perpendicular to the shroud that may be rotated around its long axis by operation of a locking lever,
a toothed block having a row of teeth on each side, the pitch between teeth of each row being equal to, or a whole multiple of, the pitch of the teeth of the corresponding row of the slot,
the block being supported by a carrier element that moves in response to rotation of the clamp bolt to move, in turn, the toothed block between a clamped position in which the block is located in the slot with the teeth of the block in the same plane as the teeth of the slot and an unclamped position in which the toothed block is held such that the teeth of the block are out of the plane of the teeth of the slot, the block being releasable from the carrier element in the event of a crash such that the toothed block contacts the puller;
and in which a contact face of the puller and a contact face of the toothed block are arranged such that the toothed block is prevented from rotating more than a predetermined amount when forced onto the puller, urging the toothed block into engagement with the teeth of the slot.

The block acting on the puller creates a rotational moment, when the block is askew relative to the puller. Thus, the block tries to rotate and in doing so is urged onto the teeth on one side of the slot in a manner that ensures the block will not twist out of engagement from the opposing rotational moment generated by the teeth of the slot acting on the teeth of the block. This opposing rotational moment is generated because the teeth are located along the edge of the block.

The contact face of the puller may comprise a first planar face that extends from a first point closer to the centre line of the slot to a second point closer to the edge of the slot onto which the block is biased, the planar face tapering back from the first point towards the second point, and the contact face of the toothed block may comprise a corresponding planar faces that cooperates with the first planar face.

The face of the puller may therefore be considered to be cut away towards one side, and the face of the puller protrudes towards that same side.

The first point on the contact face of the puller may be offset from the centre of the contact face of the puller, which may in turn be offset from the centre line of the slot in a direction towards the side of the slot towards which the toothed block is to be biased b the puller.

The first planar face may fall away at a pressure angle of between 5 degrees and 20 degrees. The corresponding face of the toothed block, when unrotated in the slot may have a pressure angle of between 5 degrees and 23 degrees, the pressure angle of the toothed block being slightly higher than that of the puller. Once rotated the pressure angle of the toothed block may match that of the puller.

The corresponding planar face may be at a greater angle than the first planar face.

The puller may be arranged to move sideways across the slot when it first engages the toothed block, the sideways motion optionally producing a rotation of the toothed block due to the inclined contact faces, the sideways motion stopping once the puller has moved to contact a side of the slot or the tips of the teeth on a side of the slot.

The puller may be arranged so that upon further rotation of the toothed block occurs as the force of the toothed block onto the puller increases.

One of the puller and the toothed block may be plastically deformable under the typical load expected during a collapse, deformation occurring after the puller has completed its permitted sideways movement.

The teeth of the toothed block may be plastically deformable.

The toothed block may carry a plurality of teeth on each side, such as 2, 3 or 4 teeth. The plastic deformation of the puller and/or toothed block may be such that under a high load all of the teeth on one side of the block fully engage the teeth on that side of the slot whilst the block is slightly rotated in the slot.

The puller may comprise a block that is connected to a deformable energy absorbing strap.

The strap may extend between the puller block and the support bracket, or a fixing that is secured to the support bracket by the clamp mechanism that does not move axially with the outer shroud as it collapses. The movement of the puller deforms the strap, absorbing energy in the collapse.

The carrier element may support the block such that the block is free to move from side to side when in the slot.

The teeth of the two rows of teeth of the slot and the teeth of the two rows of teeth of the block are shaped such that for any given position of the outer shroud relative to the inner shroud the block is free to move into the slot when the carrier is in moved into the clamped position from the unclamped position without being blocked by the teeth of the block striking the teeth of the slot.

The teeth of a first row of the slot and the corresponding teeth of the block when in flank to flank contact prevent axial movement of the block along the slot in a direction corresponding to a telescopic collapse of the shroud and in that the teeth of a second row of the slot and the corresponding teeth of the block permit axial movement of the block along the slot in a direction corresponding to a collapse of the shroud whilst applying a thrust to the block that moves the block sideways across the slot so that the flanks of the teeth of the first row face the flanks of the corresponding teeth of the block.

By providing four rows of teeth, two on the slot and two on the block arranged as described above, a steering assembly in accordance with the invention ensures that in the unclamped position of the clamp mechanism the rows of teeth on the moving rack are held clear of the rows of teeth of the fixed rack, and in an clamped position one row of teeth of the moving rack is interlocked with a row of teeth of the fixed rack, such interlocking in the clamped position being assured by arranging that the teeth on the slot and the block are aligned relative to one another such that in the event that the end faces of the teeth of one of the rows on the fixed rack are aligned in a tooth on tooth position with the end faces of the teeth of one of the rows of the moving rack, the teeth of the other row on the slot will not be aligned in a tooth on tooth position with the teeth of the other row on the block and further by the mechanism being so constructed and arranged that when this tooth on tooth event occurs on moving from the unclamped position to the clamped position then during continued movement the teeth of the slot interacts with the teeth of the block to cause the block to move sideways across in the direction of the rows of teeth that are not in a tooth on tooth position thereby to cause those rows of teeth to become inter-engaged when the mechanism finally reaches the locked position.

Because there is always one pair of rows of teeth that are not in a tooth on tooth position during locking, and the moving rack is caused to move to permit that pair of rows to engage, then positive locking is always assured.

Furthermore because the tips of the teeth of each row extend in a plane that is parallel to the tips of the teeth of the other rows it is ensured that in the event of a crash—which would tend to cause the fixed and moving racks to try to move parallel to one another in a direction along which the rows of teeth extend—there is no component of the force in the direction of unlocking movement of the moving rack. If this was present it would be highly undesirable as the crash load would attempt to stretch the clamp pin resulting in potential failure. At the very least this unwanted force would necessitate a beefed up support bracket against which the force could be reacted, which is again undesirable.

The teeth may therefore all extend in a direction parallel to the general direction of movement of the toothed block generated by the clamping mechanism as it moves from unlocked to locked.

The assembly may be arranged such that for all telescopic positions of the shroud portions, positive locking can be attained. One way of ensuring this is for by arranging for the teeth of the rows of teeth to all have the same pitch (the spacing from the tip of one tooth to the tip of an adjacent tooth. They may all have the same tooth height (measured from the throat to tip) so that they can be fully engaged.

The teeth of the first side of the slot and toothed block may be considered to be functional teeth in so far as they are actively engaged in a crash to prevent collapse. The teeth on the other side of the slot and toothed block may be considered to be non-functional teeth because they do not prevent movement of the shroud in the collapse direction but do push the block across to the other side of the slot to allow the functional teeth to prevent further movement.

The purpose of the functional and non-functional teeth is to ensure that the block is always located on the same side of the slot during a crash, regardless of the position in which it is located immediately following clamping when it is moved to the first position.

The puller may urge the block onto the teeth of the functional side during a collapse.

The perpendicular distance between the tips of one row of teeth of the toothed block and the tips of the other row of the toothed block may be substantially equal to the spacing between the tips of one row of the slot and the roots of the other row, thereby substantially preventing rotation of the block in the slot when the tips of one row of the block are aligned with the tips of the corresponding row of teeth of the slot.

The teeth of one row of the slot may be staggered along the slot relative to the teeth of the other row of the slot, whilst the teeth of one row of the toothed block may be in alignment with the teeth of the other row of the toothed block.

Alternatively the teeth of one row of the block may be staggered along the block relative to the teeth of the other row of the block, whilst the teeth of one row of the slot may be in alignment with the teeth of the other row of the slot.

The teeth that are staggered may be offset relative to each other substantially one half of the pitch between the teeth in a row.

All of the teeth in each row, of the slot and of the block, may be spaced from the adjacent tooth or teeth by the distance, i.e. the teeth of the row all have the same pitch e.

The shape of every tooth in a row may be the same. The teeth may be aligned in the same orientation as the adjacent tooth or teeth. They may each have the same height, and same width.

Each of the teeth of the rows may comprise saw teeth. This allows a small pressure angle, perhaps down to 0 degrees, to be achieved on one flank of the tooth whilst maintaining a sufficient width at the root of the tooth to prevent it from snapping off.

The pressure angle of the flanks of the teeth on the functional side that contact each other as the column collapses may be zero degrees, to give the maximum blocking of movement independent of the coefficient of friction of the flank surfaces. A non-zero pressure angle may also be acceptable. As long as the tangent of the pressure angle is less than the friction coefficient acting between the teeth, then there will be no sideways separation of the teeth on the functional side, and hence a total positive block on further collapse of the shroud will be assured.

Both of the teeth of the slot and the teeth of the block on the functional side may include flat portions that have this zero, or near zero pressure angles so they contact over a wide area defined by the overlap of the flat portions.

The pressure angle of the flanks of the teeth on the non-functional side that contact each other as the shroud moves in the collapse direction may be between 30 degrees and 60 degrees, with a pressure angle of substantially 50 degrees being preferred, to give an optimal thrust of the block towards the functional side. A coefficient of friction of the flanks of the teeth may be kept low, for instance using a low friction coating such as PTFE, to prevent binding.

Similarly, the pressure angle of the flanks of the teeth on the functional side that come into contact as the shroud extends telescopically may be between 30 degrees and 60 degrees, with a pressure angle of substantially 50 degrees being preferred, to push the block across to the function side if the driver tries to pull on the steering wheel during normal use. The pressure angle of the flanks of the teeth on the non-functional side that comes into contact as the shroud is extended may be zero degrees, or close to zero, to give positive blocking of movement when clamped against the wheel being pulled towards the driver.

A flat tip may be provided on the teeth located on the non-functional side that in use will slide over one another in the event of the block moving along the slot whilst it is aligned with the functional side of the slot. The flat tip may be bounded by rounded corners which ensure that the tips will not be damaged when they come into contact and help guide the block until the flat tips are in contact.

The provision of the flat tip maximizes the time the block spends on the functional side as it moves along the slot.

The height $b2$ of the teeth of the slot relative to the width of the slot $b1$, and relative to the width $a$ of the block a measured between the tips of the two rows of teeth on the block, may be chosen such that when the flat tips are in contact the tips of the teeth on the functional side of the block are in contact with, or within no more than 1 mm or 2 mm of the lands between the teeth of the slot on the functional side.

The lands between the teeth on the functional side may also be flat to guide the toothed block.

The tips of the teeth on the functional side may be pointed, without any notable flat portion, as there is no advantage in ensuring that the block stays aligned with the non-functional side of the slot for any extended distance.

The clamp rail may be fixed to an upper face of the inner shroud portion or to a side face.

To ensure tooth on tooth blocking does not occur during clamping, the end faces of the teeth of the slot and/or the block may be chamfered or bevelled to define complimentary ramps. The ramps formed by the ends of one of the two rows of teeth whose tips face each other may slope such that a line extended from the root of the tooth and onwards past the tips will intersect a corresponding line from the ramp of that other facing row of teeth. The ramps of the other two rows of teeth that face away may slope in the opposite direction such that a line extended from the tip of the tooth and onwards past the roots will intersect a corresponding line from the ramp of that other row of teeth.

In one arrangement, the ramps may be shaped such that the teeth are wider at their root than at their tips. The ramps ensure that in the event that the sides of teeth of the block strike the sides of the teeth of the slot, any locking force which is applied will therefore be partially converted into the sideways force needed to move the moving block to the side.

Of course, it need not be direct contact between the bevelled, ramped, end faces of the teeth that causes the sideways movement of the block. The block and the rail alongside the slot may be provided with protrusions which strike one another when the teeth are, or would otherwise be, in a tooth on tooth position. These protrusions, rather than the teeth themselves, then generate the sideways force. The protrusions could be considered to be guides for the moving rack.

The steering column assembly may additionally comprise a rocker a rocker including a body from which extends a lever arm, the body having an opening through which the clamp bolt passes, the rocker converting a rotation of the clamp bolt about its axis in a first direction into an upward motion of the lever arm and into a downward motion when the clamp bolt is rotated in the opposing second direction, the lever arm being connected to the carrier element such that movement of the lever arm up and down causes movement of the toothed block between the clamped and unclamped positions.

The connection between the clamp bolt and the toothed block defines a lost motion mechanism.

The lost motion mechanism may provide for lost motion between the clamp bolt and the rocker, or between the rocker and the carrier element, or between both the clamp bolt/rocker and the rocker/carrier element.

The lost motion mechanism may permit an angular movement of the clamp bolt of at least 20 degrees, or at least 30 degrees, and preferably between 30 and 40 degrees, whilst achieving a linear movement of the toothed block of less than 20 mm.

Other advantages of this invention will become apparent to those skilled in the art from the following detailed description of the preferred embodiments, when read in light of the accompanying drawings.

BRIEF DESCRIPTION OF THE DRAWINGS

FIGS. 6a to 6d show the undesirable movement of a toothed block within the slot during a collapse of the steering column assembly;

FIGS. 7a to 7c shows the desirable movement of a toothed block within the slot during a collapse of the steering column assembly.

DETAILED DESCRIPTION OF THE INVENTION

Figure 1:
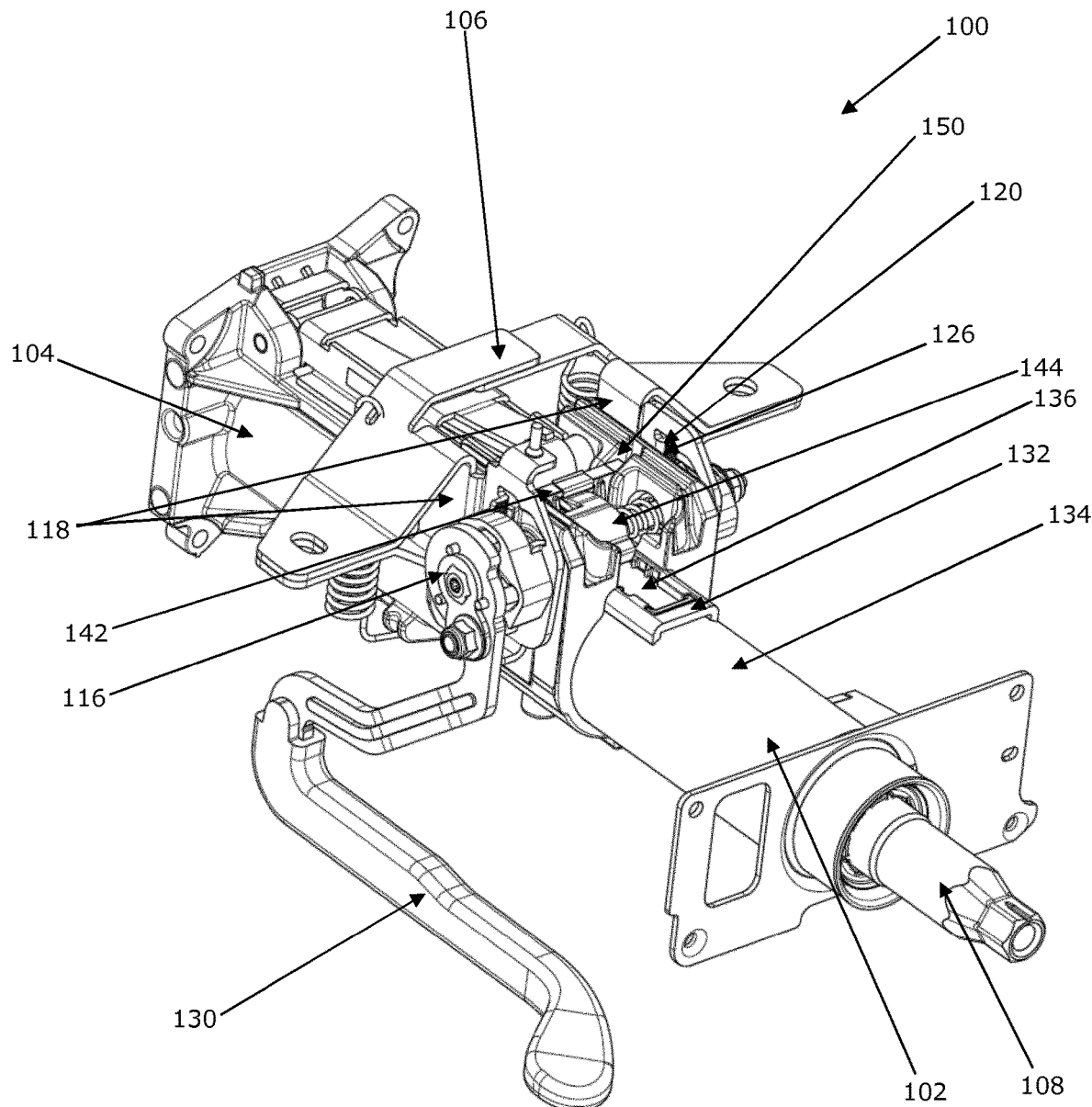
FIG. 1 depicts an isometric view of a steering column assembly in accordance with the first aspect of the invention.
Figure 2:
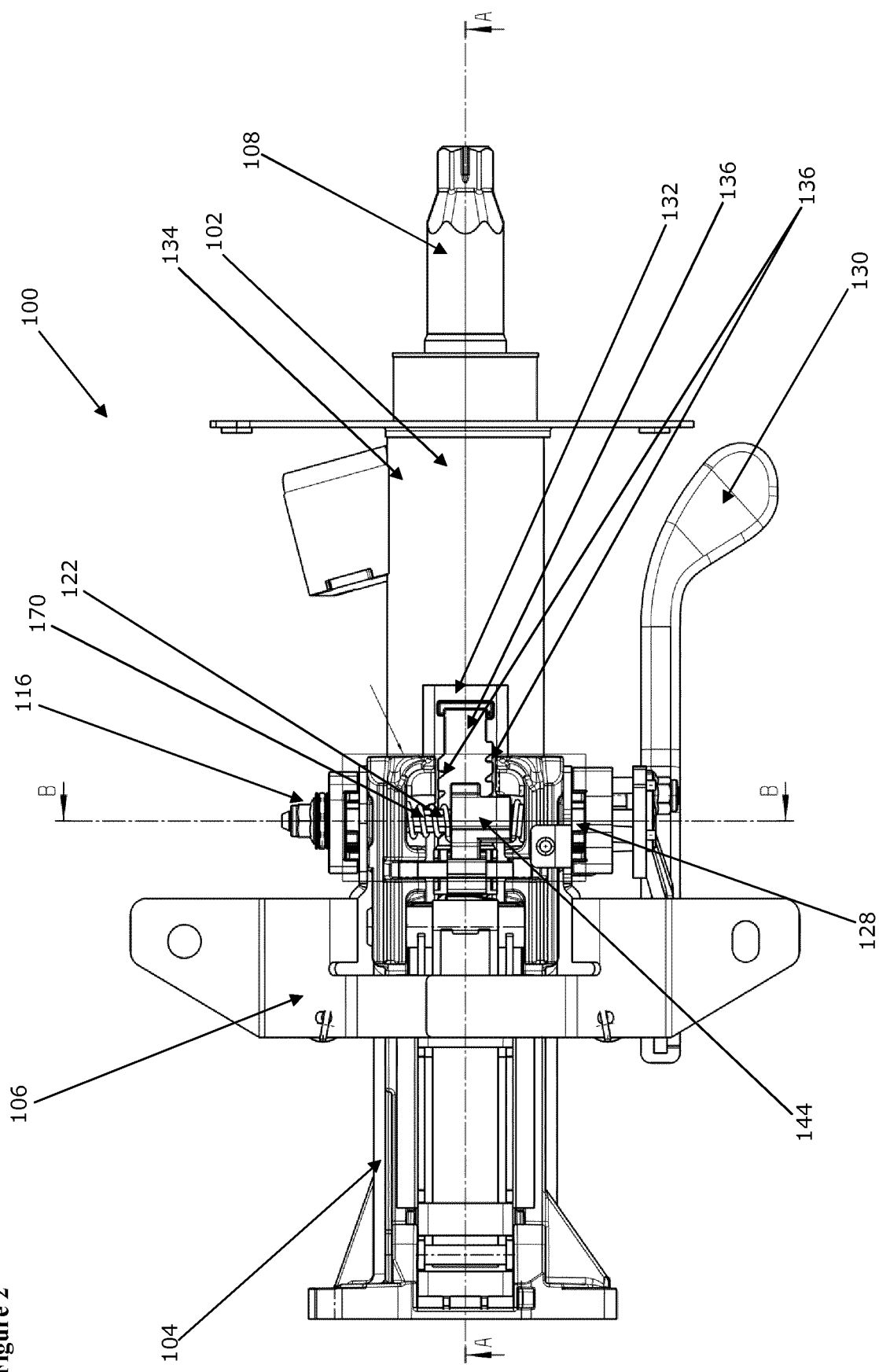
FIG. 2 shows a plan view of the steering column assembly of FIG. 1.
Figure 3:
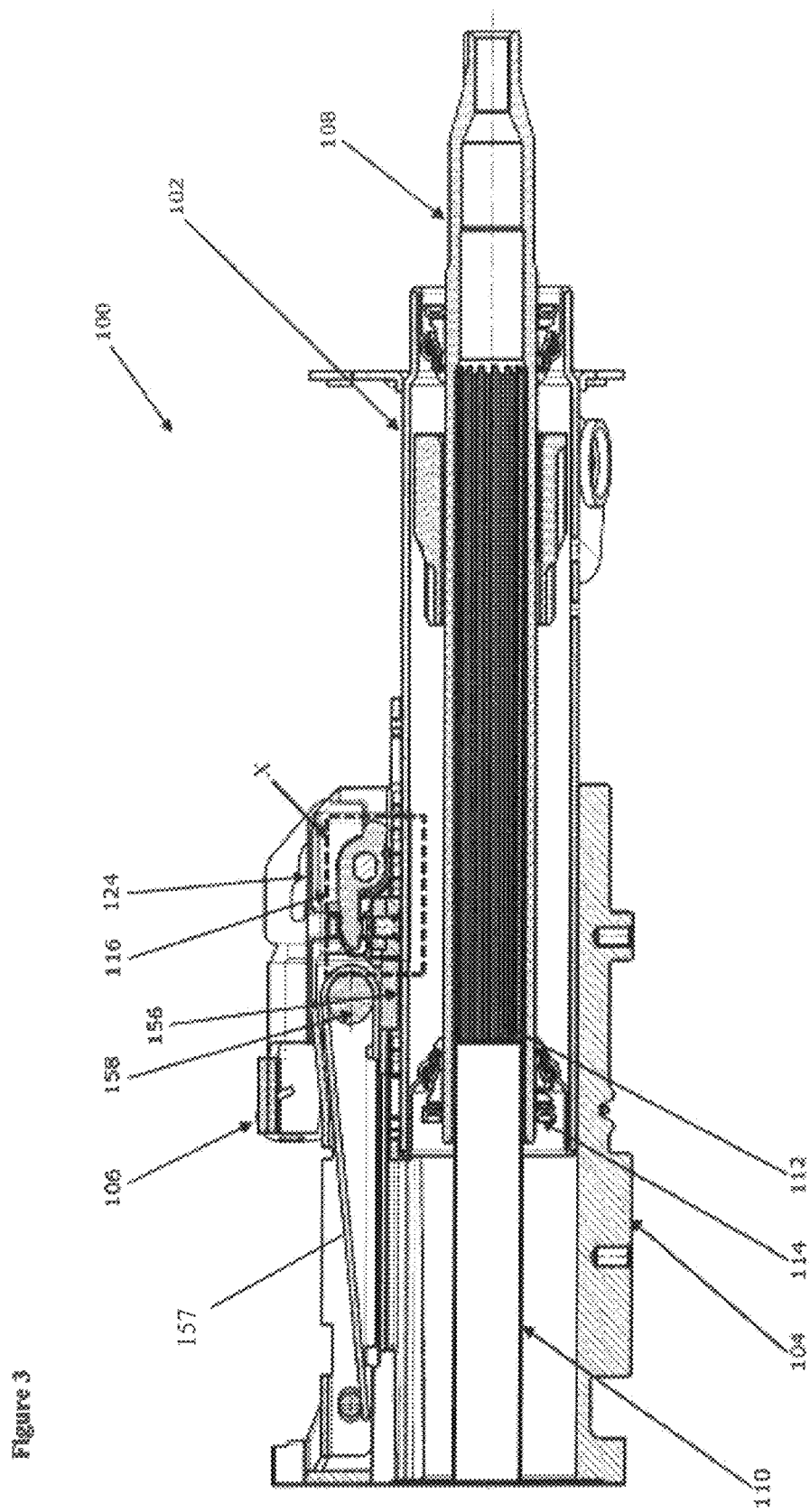
FIG. 3 is a cross-sectional representation of the steering column assembly of FIG. 2 along the line A-A.

Referring first to FIGS. 1 to 3, a steering column assembly 100 is shown, in accordance with the first aspect of the invention. The steering column assembly 100 comprise a shroud 102, 104 having and inner shroud portion 102 and an outer shroud portion 104, each of which comprises a substantially cylindrical tube. The shroud 102, 104 extends from a gearbox housing (not shown) that is fixed at a pivot point to a part of the vehicle body and also releasably fixed to a support bracket 106 which is secured to the vehicle, typically by welding or bolting it to a region under the dashboard at a point somewhere between the pivot and the steering wheel.

The shroud portions 102, 104 are moveable relative to each other with the end of the inner shroud portion 102 being a sliding fit within an end of the outer shroud portion 104. The shroud 102, 104 surrounds a telescopic steering column shaft 108, 110. The shaft 108, 110 includes an upper shaft portion 108 that at least partially surrounds a lower shaft portion 110, the two portions being connected through complimentary axially extending splines 112. The opposite end of the upper shaft portion 108 is tapered so that it can be secured to a steering wheel (not shown). The lower shaft portion 110 is connected to the gearbox housing (not shown), which in turn connects to the road wheels of the vehicle. The skilled person will understand that the invention also applied to so-called "inverted tube in tube" assemblies in which the moving part will slide over the fixed part rather than within it.

As depicted, the upper shaft portion 108 fits over the lower shaft portion 110 and can move axially whilst the lower shaft portion 110 is fixed in an axial direction. Similarly, the inner shroud portion 102 is located towards the steering wheel and slides within the outer shroud portion 104, which is also fixed in an axial direction. An upper column bearing assembly 114 is located between the upper shaft portion and the outer shroud portion. This snugly fills the space and ensures that the shaft 108, 110 is located securely within the shroud 102, 104.

The shroud 102, 104 is fixed to the bracket 106 by a clamp mechanism 116. The clamp mechanism 116 can be unlocked and locked to allow the rake of the steering column shroud 102, 104 to be adjusted by pivoting about the pivot point. When locked the steering column shroud 102, 104 cannot easily be moved.

The bracket 106 includes two arms 118 which extend generally downwards in a vertical plane and extend down either side of the shroud 102, 104. The bracket 106 is securable to the vehicle body using bolts (not shown) that pass through openings 120 in the bracket 116.

The clamp mechanism 116 comprises a clamp bolt 122 or pin which passes through a respective generally vertical slat 124 in each arm 118. The shape of the vertical slots 124 determines the available rake adjustment of the steering column shroud 102, 104. The slots 124 include a vertical rack 126 with a plurality of teeth. Respective cams 128 mounted on the clamp bolt 122 releasably engage with the teeth of the vertical rack 126 upon rotation of the clamp bolt 122. A lever 130 mounted adjacent to one end of the clamp bolt 122 enables this rotation. Thus, the rake of the steering column assembly 100 can be adjusted.

In order to adjust for reach, a clamp rail or horizontal rack 132 is provided which in the depicted embodiment is affixed to an outer surface 134 of the inner shroud portion 102. The horizontal rack 132 includes a slot 136 with two opposing and parallel rows of teeth 138, extending in an axial direction along the inner shroud portion 102.

Releasably engageable with the horizontal rack 132 is a toothed block 140. The toothed block 140 includes a row of teeth on each of its sides which are complementarily-shaped so as to allow engagement with the teeth of the horizontal rack 132. The toothed block 140 it is held in a fixed position relative to the support bracket 106 by a carrier element 142. Thus, with the toothed block 140 in a clamped condition, the teeth provide positive locking of the toothed block 140, and thus the support bracket 106, relative to the horizontal rack 132 which prevents the inner shroud portion 102 moving in an axial direction. The shape and function of the teeth of the block and the teeth of the slot will be explained in more detail later in this description with reference to FIGS. 7 to 11 of the drawings.

Figure 4:
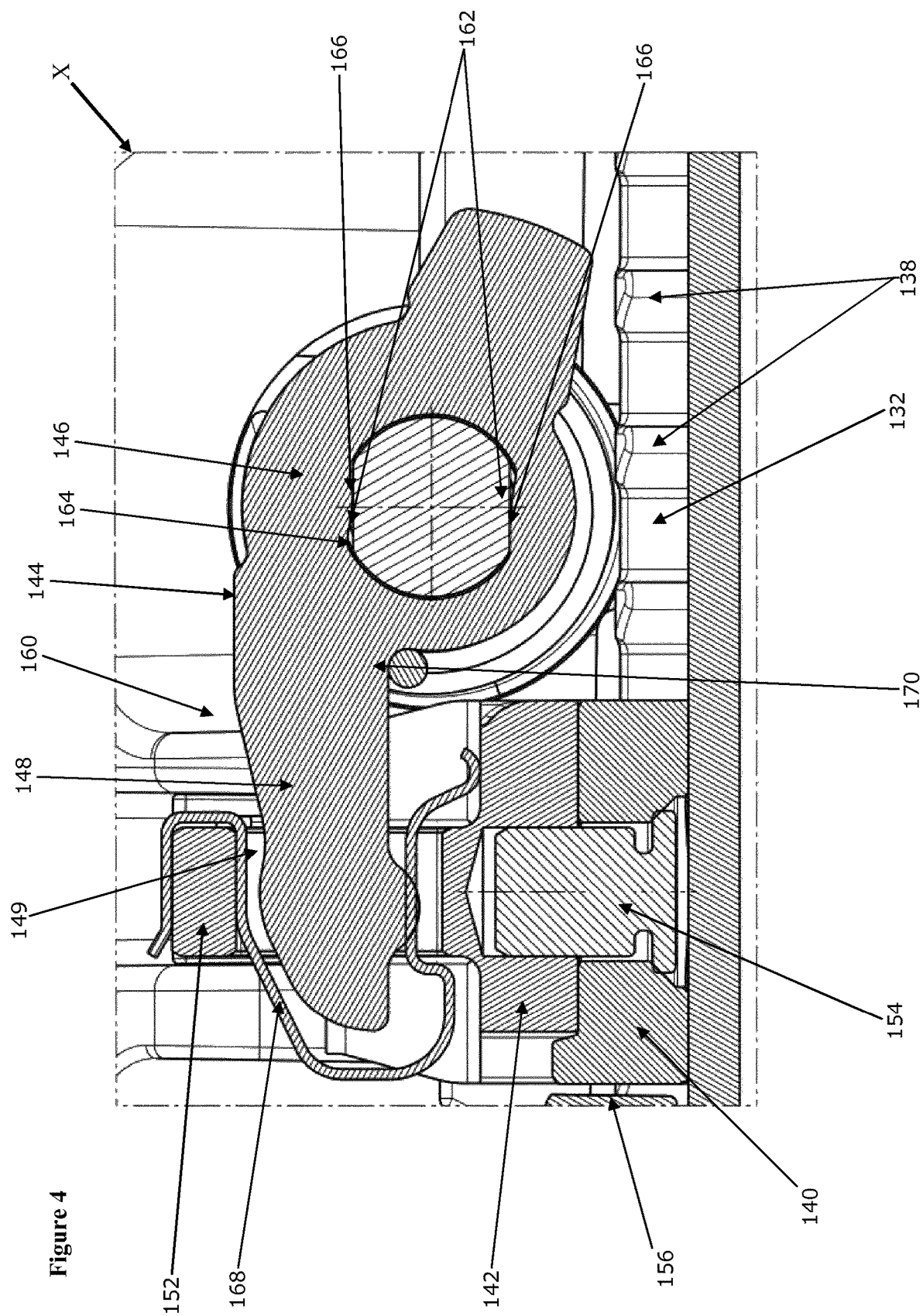
FIG. 4 is an enlarged view of the rocker, toothed block, and slot of FIG. 3.
Figure 5:
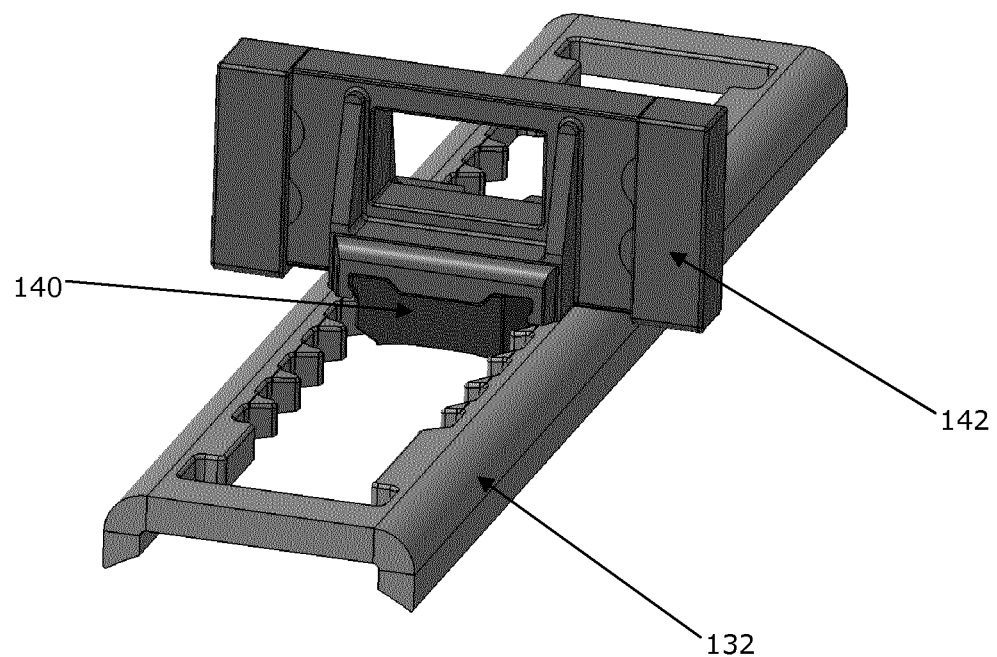
FIG. 5 shows the toothed block and the carrier element with the toothed block located in the slot in the clamped condition, all other parts being removed for clarity.

The releasable engagement of the toothed block 140 is controlled by a rocker 144 which is attached to the clamp bolt 122 and positioned, in use, between the two arms 118 of the support bracket 106. The rocker 144 is shown in detail in FIG. 4.

The rocker 144 includes a main body 146 which is located about the clamp bolt 122 and a lever arm 148 which extends towards and is received within an opening 149 in the carrier element 142. The carrier element 142 is held in the support bracket 106 within guides 150 which allow movement only in a radial direction relative to the shroud 102, 104. As such, upon rotation of the rocker 144 in a first direction, the lever arm 148 presses against an upper portion 152 of the carrier element 142, causing the movement of the carrier element 142 away from the horizontal rack 132 and drawing the toothed block 140 out of engagement. Upon rotation of the rocker 144 in a second direction opposite to the first direction, the carrier element 142 is lowered and the toothed block 140 is engaged with the horizontal rack 132.

The toothed block 140 is separable from the carrier element 142 in the event of a large force being exerted on the toothed block 140, for example in the event of a crash in which the driver of the vehicle impacts the steering wheel. The toothed block 140 is connected to the carrier element 142 by way of a frangible pin 154. The frangible pin 154 is configured to break upon the application of a predetermined force, which can thus be configured to be the force likely to be endured in a crash situation. The breaking of the frangible pin 154 allows the inner shroud portion 102, with horizontal rack 132 and toothed block 140 attached, to collapse, whilst the clamp mechanism 116 and carrier element 142 stay in position relative to the support bracket 106.

During collapse, the toothed block 140 will impact upon, and move a puller 156. The puller 156 comprises a strip of material, usually metal, which is deformed around an anvil 158 upon movement of the toothed block 140. As such, the collapse of the steering column assembly 100 is controlled. The puller may comprise a block that is connected to a deformable energy absorbing strap 157, shown in FIG. 3.

The clamp mechanism 116, including the rocker 144 and carrier element 142, also comprises a lost motion mechanism 160. The lost motion mechanism 160 is configured such that the lever 130 of the clamp mechanism 116 can move through an angle which is comparatively larger than that to engage and disengage the toothed block 140. This results in an enhanced user experience.

A first part of the lost motion mechanism 160 is allowed by the relative shapes of the rocker 144 and clamp bolt at the point at which they engage. The relative shapes allow the clamp bolt 122 to freely within the rocker 144 before engaging and causing movement of the rocker 144. This allows the lever 130 to move through a predetermined angle allowed by the relative shapes of the rocker 144 and clamp bolt 122 before moving the rocker 144. This first part of the lost motion mechanism 160 therefore causes rotational reduction between the clamp bolt 122 and rocker 144.

In the depicted embodiment, the clamp bolt 122 is formed as a cylinder flattened so as to produce two additional opposing faces 162. Similarly, a bore 164 of the rocker 144 through which the clamp bolt 122 passes is substantially cylindrical but with two opposing inwardly-curved faces 166. Spaces are formed between the opposing faces 162 of the clamp bolt 122 and the inwardly-curved faces 166 of the rocker 144 which allows the lost motion before engagement. Due to the curvature of the inwardly-curved faces 166 of the rocker 144, the area of engagement is relatively large such that the force of the lever 130 motion is spread over the rocker 144. However, it is also possible to provide planar faces, although this may result in high levels of stress within the rocker 144.

Alternative methods of allowing motion between the clamp bolt 122 and the rocker 144 before engagement may also be used. For example, loose fitting pins between the two parts could allow free play or any other form of inter-engagement may be adapted to achieve this feature.

A further part of the lost motion mechanism 160 is formed by the engagement of the lever arm 148 of the rocker 144 with the carrier element 142. The opening 149 in the carrier element 142 is larger than the lever arm 148 such that the lever arm 148 may move within the carrier element 142 before contacting the carrier element 142. Additionally, as the opening 149 is wider than the lever arm 148, the carrier element 142 may move laterally during engagement of the toothed block 140 with the horizontal rack 132, aiding engagement.

As an additional feature, a leaf spring 168 is positioned at least partially between the lever arm 148 and the carrier element 142. In the depicted embodiment the leaf spring 168 acts to provide a biasing force to the carrier element 142, when the clamp mechanism 116 is in the clamped position. Advantageously, the leaf spring 168 also reduces rattle of the carrier element 142, ensuring that the assembly feels of a high quality to a user. The leaf spring 168 is fixed onto the upper portion 152 of the carrier element 142 and extends over an end of the lever arm 148. When the lever arm 148 moves clockwise, the leaf spring 168 does not absorb any of the motion and the lever arm 148 forces the carrier element 142 to move upwards in the guides 150. However, when the lever arm 148 moves anticlockwise, the spring 168 does resist the motion once the toothed block 140 is engaged, causing the biasing force to be applied to the toothed block 140 and providing increased force feedback to the user, such that they are aware that the toothed block 140 is engaged with the horizontal rack 132. In order to assist with the depression of the leaf spring 168, the lever arm 148 includes a protrusion which engages with the leaf spring 168 throughout the motion. Alternatively, the protrusion may be found on the leaf spring 168 itself.

A coil spring 170 is provided which locates the rocker 144 in the centre of the clamp bolt 122. The coil spring 170 resists any substantial lateral movement of the rocker 144 along the clamp bolt 122 whilst preventing or limit the transmission of vibrations between the support bracket 106, clamp bolt 122, and rocker 144, lowering the chances of unwanted rattle.

As shown in FIGS. 7a to 7c, the teeth of the first side of the slot 136 and toothed block 140 may be considered to be functional teeth 176 in so far as they are actively engaged in a crash to prevent collapse. The teeth on the other side of the slot 136 and toothed block 140 may be considered to be non-functional teeth 178 because they do not prevent movement of the shroud in the collapse direction but do push the toothed block 140 across to the other side of the slot 136 to allow the functional teeth 176 to prevent further movement.

The movement of potential undesirable movement of a toothed block 240 during collapse of the steering column is shown in FIGS. 6a to 6d. In FIG. 6a, it can be seen that the toothed block 240 starts off in engagement with the functional side 276 of the slot, as the horizontal rack 232 moves in an upward direction as depicted, during collapse. Initially, the three teeth 272 on the functional side 276 of the block 240 are engaged or nearly engaged.

However, the toothed block 240 has a tendency to rotate during collapse, due to its lack of fixation relative to the carrier element. Once rotation begins, the block 240 is urged by the teeth 238 of the slot 236 until it impacts upon the non-functional side 278 of the slot. This is undesirable as, when the toothed block 240 contacts the puller 256, the crash force transmitted during collapse of the steering column is transmitted through only a single tooth 282. Thus, as the toothed block 240 hits the puller 256, the force may be high enough to shear or otherwise significantly deform the single tooth 282 through which the force is transmitted, shown in FIG. 6*c*.

Once the tooth 282 has sheared, the toothed block 240 is acted upon by forces from the non-functional side 278 and the puller 256 which rotate the toothed block 240 in the opposite direction, which encourages it into engagement with the non-functional side 278 of the slot. As such, the toothed block 240 may slide back towards the functional side 276, the block 240 will slip in relation to the slot 236, and the chain of events may repeat. The collapse of the steering column will therefore be able to continue in a less controlled manner, and avoiding or limiting the effectiveness of the puller.

In FIGS. 7*a* to 7*c*, the advantage of the present arrangement over that of FIG. 6 is apparent. Starting from the same position, the toothed block 140 again starts to rotate in a clockwise direction as viewed. However, as the rotation occurs, contact surfaces 184, 186 of the toothed block 140 and puller 156 come into contact. In the present embodiment, the contact surfaces 184, 186 each comprise a tapered portion 188, 190 which is at an angle to the remainder of the contact surface 184, 186.

The tapered portion, or first planar face 188, of the puller 156 extends from a first point 192, closer to the centre line of the slot 136, to a second point 194 closer to the edge of the slot 136 onto which the toothed block 140 is to be biased. The first planar face 188 tapers back at an angle of around 20 degrees, although the angle may vary, depending on individual design.

The contact surface 184 of the toothed block 140 has a tapered portion, or corresponding planar face 190, which tapers towards forwards at a similar angle to the first planar face 188. Advantageously, the angle of the corresponding planar face 190 of the toothed block 140 may be at the same or a larger angle than that of the first planar face 188, in order that, as the toothed block 140 rotates, a tip 196 of the tapered portion 196 contacts the first planar face 188 of the puller 156.

Referring again to FIGS. 7*a* to 7*c*, it can be seen that the rotation of the toothed block 140 causes the first planar face 188 and the corresponding planar face 190 to come into contact. This contact prevents over-rotation of the toothed block 140. The contact also encourages movement of the puller 156 towards the right of the slot 136, as viewed. Simultaneously, this movement encourages rotation of the toothed block 140 in the opposing direction to its initial rotation. The puller 156 is prevented from too high a level of sideways movement. This prevention could be, for example, by a protrusion on its underside that is held within the slot and thus collides with the tips of the teeth 138 of the slot 136 when at the extremes of its movement.

Even with the toothed block 140 in a non-optimum position, such as with a slight rotation, the teeth on the functional side 176 of the toothed block 140 are kept in sufficient engagement with the teeth 138 of the slot 136 to prevent overloading and subsequent failure of any of the teeth. As the toothed block 140 contacts the puller 156, this engagement may result in deformation of the teeth of the slot 136 or the toothed block 140, enhancing the engagement further and ensuring that the force of the collapse is transmitted through the assembly. Furthermore, the contact surface 184, 186 of the puller 156 or toothed block 140 may also deform, in order to transmit the force more effectively. The deformation can be improved by use of a material with a lower hardness for one of the toothed block 140 and slot 136, such that the teeth may more easily deform.

Figure 8A:
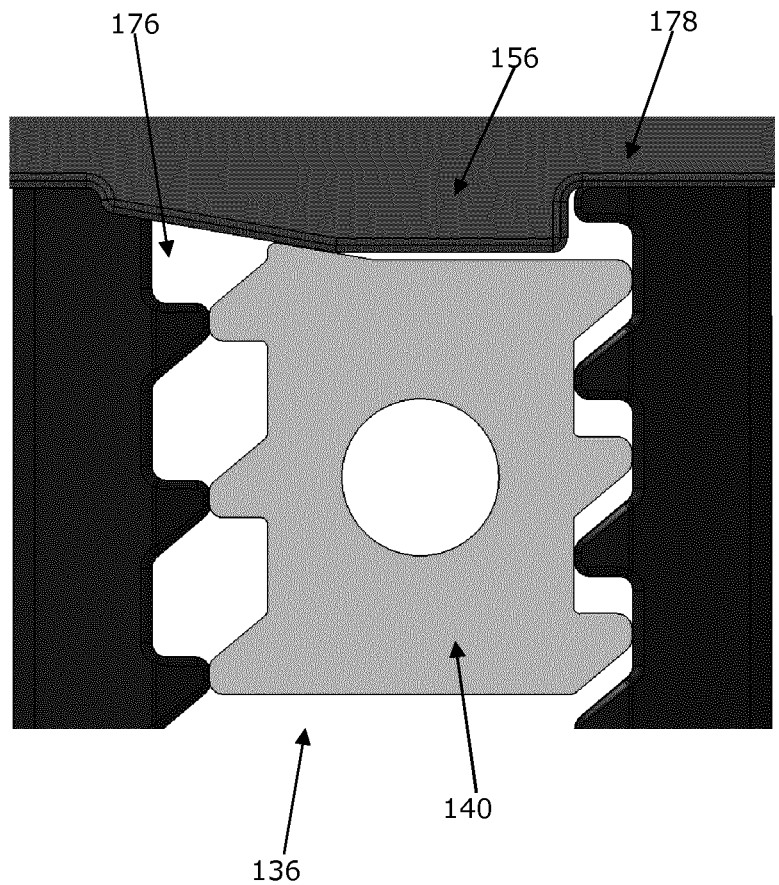
FIGS. 8a and 8b show the arrangement of a toothed block and puller in accordance with the first aspect of the invention, with the toothed block aligned with the non-functional side.

In FIG. 8*a*, where the toothed block 140 impacts the puller 156 whilst aligned with the non-functional side 178 of the slot 136, it is apparent how the contact surfaces engage, again preventing any substantial rotation of the toothed block 140. As the column collapses, the non-functional side 178 will encourage the toothed block 140 towards the functional side 176, leading to the arrangement of FIG. 7*a*.

Figure 8B:
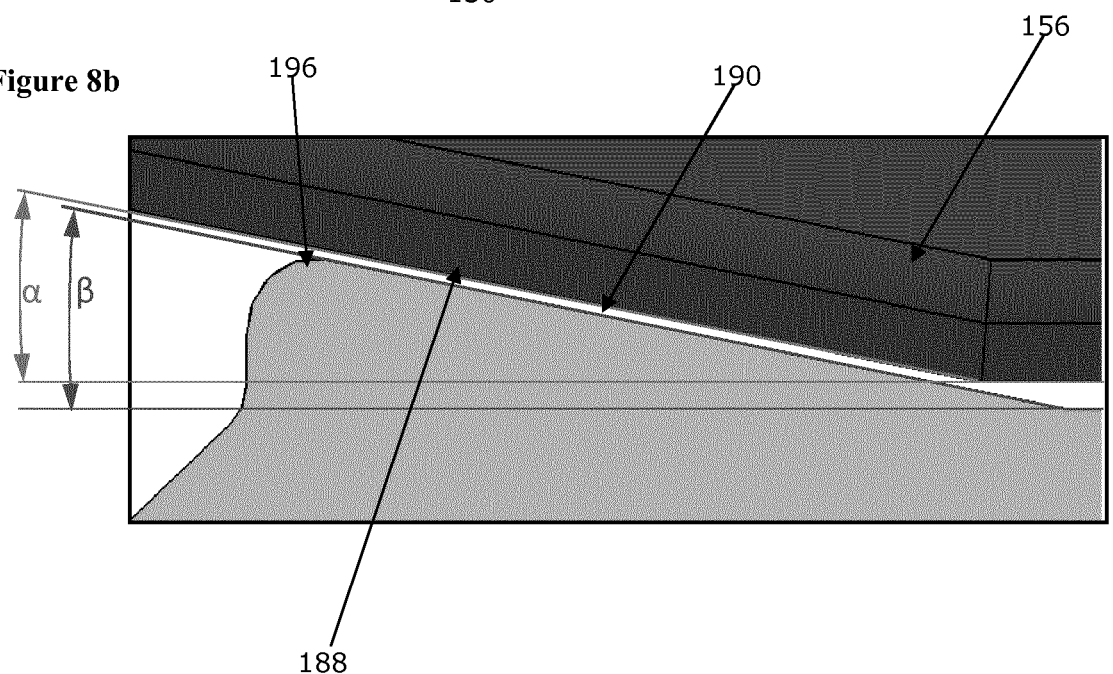

In the enlarged view of this contact, shown in FIG. 8*b*, it can be seen that, in order to maximise the effectiveness of the rotation prevention, the angles of the first planar face 188 and the corresponding planar face 190 should be different. Specifically, it is advantageous for the angle, $\beta$, of the corresponding planar face 190 to be greater than the angle, $\alpha$, of the first planar face 188. By doing so, it is more likely that the tip 196 of the tapered portion of the toothed block 140 is the first part to contact the puller 156 contact surface 186.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

The invention claimed is:

1. A steering column assembly comprising:
a support bracket,
a telescopic shroud having an outer shroud portion and an inner shroud portion, an end of the inner shroud portion extending into the outer shroud portion, the inner shroud portion being fixed in position relative to the support bracket by a clamp mechanism,
an energy absorbing mechanism that includes a puller,
a clamp rail fixed to the inner shroud portion including a slot that extends axially along the inner shroud portion, the slot defining two opposing walls which each carry a row of teeth, the two rows thereby being spaced apart from one another with the teeth extending towards each other; the puller being positioned adjacent the slot,
a clamp bolt that extends perpendicular to the telescopic shroud that is configured to be rotated around its long axis by operation of a locking lever,
a toothed block having a row of teeth on each side, a pitch between teeth of each row being equal to, or a whole multiple of, the pitch of the teeth of the corresponding row of the slot,
the toothed block being supported by a carrier element that moves in response to rotation of the clamp bolt to move, in turn, the toothed block between a clamped position in which the toothed block is located in the slot with the teeth of the toothed block in the same plane as the teeth of the slot and an unclamped position in which the toothed block is held such that the teeth of the toothed block are out of the plane of the teeth of the slot, the toothed block being releasable from the carrier element in the event of a crash such that the toothed block contacts the puller;
and in which a contact face of the puller and a contact face of the toothed block are arranged such that the toothed block is prevented from rotating more than a predetermined amount when forced onto the puller, urging the toothed block into engagement with the teeth of the slot.

2. The steering column assembly as claimed in claim 1, wherein the contact face of the puller comprises a first planar face, that extends from a first point closer to the centre line of the slot to a second point closer to an edge of the slot onto which the toothed block is biased, the first planer face tapering back from the first point towards the second point.

3. The steering column assembly as claimed in claim 2, wherein the contact face of the toothed block comprises a corresponding planar face that cooperates with the first planar face.

4. The steering column assembly as claimed in claim 2, wherein the first point of the contact face of the puller is offset from the centre of the contact face of the puller in a direction towards the side of the slot towards which the toothed block is to be biased by the puller.

5. The steering column assembly as claimed in claim 2, wherein the first point of the contact face of the puller is offset from the centre line of the slot in a direction towards the side of the slot towards which the toothed block is to be biased by the puller.

6. The steering column assembly as claimed in claim 2, wherein the first planar face falls away at an angle of between 5 degrees and 20 degrees.

7. The steering column assembly as claimed in claim 2, wherein the puller is arranged to move sideways across the slot when it first engages the toothed block, the sideways motion producing a rotation of the toothed block due to inclined contact faces, the sideways motion stopping once the puller has moved to contact a side of the slot or tips of the teeth on a side of the slot.

8. The steering column assembly as claimed in claim 7, wherein one of the puller and the toothed block is plastically deformable under a typical load expected during a collapse, deformation occurring after the puller has completed permitted sideways movement thereof.

9. The steering column assembly as claimed in claim 8, wherein the toothed block includes a plurality of teeth on each side, the plastic deformation of the puller and/or toothed block being such that, under a high load, all of the teeth on one side of the toothed block fully engage the teeth on that side of the slot whilst the toothed block is slightly rotated in the slot.

10. The A steering column assembly as claimed in claim 1, wherein the puller comprises a block that is connected to a deformable energy absorbing strap.

11. The steering column assembly as claimed in claim 1, wherein the carrier element supports the toothed block such that the toothed block is free to move side-to-side when in the slot.

12. The steering column assembly as claimed in claim 1, wherein the teeth of the two rows of teeth of the slot and the teeth of the two rows of teeth of the toothed block are shaped such that for any given position of the outer shroud portion relative to the inner shroud portion the toothed block is free to move into the slot when the carrier element is in moved into the clamped position from the unclamped position without being blocked by the teeth of the toothed block striking the teeth of the slot.

13. The steering column assembly as claimed in claim 1, wherein the teeth of a first row of the slot and the corresponding teeth of the toothed block when in flank to flank contact prevent axial movement of the toothed block along the slot in a direction corresponding to a telescopic collapse of the telescopic shroud and in that the teeth of a second row of the slot and the corresponding teeth of the toothed block permit axial movement of the toothed block along the slot in a direction corresponding to a collapse of the telescopic shroud whilst applying a thrust to the toothed block that moves the toothed block sideways across the slot so that flanks of the teeth of the first row face flanks of the corresponding teeth of the toothed block.

14. The steering column assembly as claimed in claim 1, wherein the teeth of a first side of the slot and toothed block are considered to be functional teeth in so far as they are actively engaged in a crash to prevent collapse, and the teeth on the other side of the slot and toothed block are considered to be non-functional teeth because they do not prevent movement of the shroud in the collapse direction but do push the toothed block across to the other side of the slot to allow the functional teeth to prevent further movement.

15. The steering column assembly as claimed in claim 14, wherein the puller urges the toothed block onto the teeth of the functional side during a collapse.

16. The steering column assembly as claimed in claim 1, wherein a perpendicular distance between tips of one row of teeth of the toothed block and tips of the other row of the toothed block is substantially equal to the spacing between tips of one row of the slot and roots of the other row, thereby substantially preventing rotation of the toothed block in the slot when the tips of one row of the toothed block are aligned with the tips of the corresponding row of teeth of the slot.

17. The steering column assembly as claimed in claim 1, wherein the teeth of one row of the slot are staggered along the slot relative to the teeth of the other row of the slot, whilst the teeth of one row of the toothed block are in alignment with the teeth of the other row of the toothed block.

18. The steering column assembly as claimed in claim 1, further comprising a rocker including a body from which extends a lever arm, the body having an opening through which the clamp bolt passes, the rocker converting a rotation of the clamp bolt about an axis thereof in a first direction into an upward motion of the lever arm and into a downward motion when the clamp bolt is rotated in the opposing second direction, the lever arm being connected to the carrier element such that movement of the lever arm up and down causes movement of the toothed block between the clamped and unclamped positions.

19. The steering column assembly as claimed in claim 18, wherein the connection between the clamp bolt and the toothed block defines a lost motion mechanism.

20. The steering column assembly as claimed in claim 19, wherein the lost motion mechanism provides for lost motion between the clamp bolt and the rocker, or between the rocker and the carrier element, or between both the clamp bolt/rocker and the rocker/carrier element.

21. The steering column assembly as claimed in claim 19, wherein the lost motion mechanism permits an angular movement of the clamp bolt of at least 20 degrees, whilst achieving a linear movement of the toothed block of less than 20 mm.

* * * * *